United States Patent [19]

Nishikawa et al.

[11] Patent Number: 5,571,865

[45] Date of Patent: Nov. 5, 1996

[54] THERMOPLASTIC POLYMER COMPOSITION

[75] Inventors: Makoto Nishikawa; Mizuho Maeda; Hiromichi Nakata; Hideo Takamatsu, all of Kashima-gun; Yoshio Hirayama, Azuma-mura, all of Japan

[73] Assignee: Kuraray Co., Ltd., Kurashiki, Japan

[21] Appl. No.: 440,123

[22] Filed: May 12, 1995

[30] Foreign Application Priority Data

May 16, 1994 [JP] Japan ................................. 6-125692
Jul. 22, 1994 [JP] Japan ................................. 6-191926

[51] Int. Cl.$^6$ ........................... C08F 297/04; C08L 53/00
[52] U.S. Cl. ................................. 525/98; 525/314
[58] Field of Search ......................... 525/98, 314

[56] References Cited

U.S. PATENT DOCUMENTS

| | | | |
|---|---|---|---|
| 3,985,826 | 10/1976 | Futamura | 525/98 |
| 5,187,236 | 2/1993 | Coolbaugh | 525/314 |
| 5,268,427 | 12/1993 | Coolbaugh | 525/98 |
| 5,310,490 | 5/1994 | Struglinski | 252/43 |

FOREIGN PATENT DOCUMENTS 2176790 1/1987 United Kingdom.

OTHER PUBLICATIONS

Database WPI, Derwent Publications, AN 89–232357, JP–A–01 168 743, Jul. 4, 1989.

*Primary Examiner*—Joseph L. Schofer
*Assistant Examiner*—I. Zemel
*Attorney, Agent, or Firm*—Oblon, Spivak, McClelland, Maier & Neustadt, P.C.

[57] ABSTRACT

A thermoplastic polymer composition which comprises 100 parts by weight of polypropylene (1);

5 to 100 parts by weight of a hydrogenated block copolymer (2) which has at least one block A, at least one block B and at least one block C and which has a number average molecular weight of not higher than 700,000 wherein the block A consists essentially of a butadiene polymer having a number average molecular weight of 2500 to 200,000 and a vinyl bond content of not higher than 20%, the block B consists essentially of a polymer of isoprene and butadiene at a ratio by weight of 30:70 to 100:0 and has a number average molecular weight of 30,000 to 300,000 and a vinyl bond content of not higher than 20%, and the block C consists essentially of a polymer of isoprene and butadiene at a ratio by weight of 0:100 to 100:0 and has a number average molecular weight of not higher than 200,000 and a vinyl bond content of not less than 40%; and 0 to 100 parts by weight of an ethylene/propylene rubber wherein the ratio of the melt viscosity of hydrogenated block copolymer (2) to the melt viscosity of the polypropylene (1) as determined at 200° C. at a shear rate of 1220 second$^{-1}$, is in the range of 0.5:1 to 10:1.

12 Claims, No Drawings

THERMOPLASTIC POLYMER COMPOSITION

BACKGROUND OF THE INVENTION

1. Field of the Invention

This invention relates to a thermoplastic polymer composition which has good injection moldability and is capable of yielding molded articles having good stiffness and a good impact resistance at low temperatures. The thermoplastic polymer composition of the present invention is moldable into molded articles as having good characteristic properties suitable for internal and external parts of automobiles and various types of industrial parts.

2. Related Art of the Invention

Thermoplastic polymer compositions comprising blended compositions of polypropylene and ethylene/propylene rubbers have been used as a starting material for obtaining molded articles in various fields including the field of internal and external parts of automobiles. This is because such compositions are moldable into articles which have good mechanical strength and impact resistance, and are excellent in economy and recycling efficiency.

However, the conventional thermoplastic polymer compositions comprising polypropylene and ethylene/propylene rubbers have not been yet satisfactory with respect to injection moldability and the balance of stiffness at normal temperatures and an impact resistance at low temperatures of the molded articles obtained therefrom.

For the purpose of imparting flexibility and processability to polyolefin such as polyethylene, polypropylene and the like, it has been disclosed in Japanese Patent Application Laid-open No. 1-168743 to blend, with the polyolefin, hydrogenated copolymers of isoprene and butadiene having a number average molecular weight of 5000 to 150,000. In this Laid-open publication, no mention is made of the ratio in melt viscosity between the hydrogenated block copolymer and the polyolefin at the time of the blending.

SUMMARY OF THE INVENTION

It is an object of the present invention to provide a thermoplastic polymer composition which has good injection moldability and which can provide molded articles having well-balanced properties of stiffness at normal temperatures and impact resistance at low temperatures.

The above object can be achieved, according to the present invention, by a thermoplastic polymer composition which comprises:

100 parts by weight of polypropylene (1);

5 to 100 parts by weight of a hydrogenated block copolymer (2) which has at least one block A and at least one block B, or has at least one block A, at least one block B and at least one block C and which has a number average molecular weight of not higher than 700,000 wherein the block A consists essentially of a butadiene polymer having a number average molecular weight of 2,500 to 200,000 and a vinyl bond content of not higher than 20%, the block B consists essentially of a polymer of isoprene and butadiene at a ratio by weight of 30:70 to 100:0 and has a number average molecular weight of 30,000 to 300,000 and a vinyl bond content of not higher than 20%, and the block C consists essentially of a polymer of isoprene and butadiene at a ratio by weight of 0:100 to 100:0 and has a number average molecular weight of not higher than 200,000 and a vinyl bond content of not less than 40%; and 0 to 100 parts by weight of an ethylene/propylene rubber, wherein a ratio between a melt viscosity of the hydrogenated block copolymer (2) and a melt viscosity of the polypropylene (1) as determined at 200° C. at a shear rate of 1220 second$^{-1}$ is in the range of 0.5:1 to 10:1.

DETAILED DESCRIPTION OF THE INVENTION

The invention is described in more detail.

The polypropylene which is the component (1) used in the thermoplastic polymer composition of the present invention is not critical in type. For instance, where importance is placed on the stiffness of the resultant molded article, homopolypropylene is preferably used. Likewise, where importance is placed on impact resistance of the resultant molded article, block polypropylene is preferably used and where transparency of the resultant molded article is important, random polypropylene is preferably used. Of course, these polypropylene may be used in combination.

When polypropylene which has an MFR (melt flow ratio) value of lower than 5 g/10 minutes when determined at 230° C. under a load of 2.16 kg, the moldability of the resultant polymer composition lowers. Accordingly, it is preferred that the polypropylene used should have an MFR value of not lower than 5 g/10 minutes, more preferably not lower than 10 g/10 minutes.

As the polypropylene, there may be polypropylene which is modified with carboxylic acid derivatives or anhydrides thereof, or polypropylene into which functional groups such as a hydroxyl group, a carboxyl group, an epoxy group and the like are introduced at the terminal end thereof.

The block A in the hydrogenated block copolymer which is the component (2) of the thermoplastic polymer composition of the present invention is a hydrogenated block of a butadiene polymer which has a number average molecular weight of 2,500 to 200,000 and a vinyl bond content of not larger than 20%.

When the vinyl bond content in the hydrogenated block of the butadiene polymer exceeds 20%, the resultant molded articles are not satisfactory with respect to stiffness.

The number average molecular weight of the polymer used in the present invention is intended to mean a molecular weight, calculated as polystyrene, which is determined according to the GPC method.

When the number average molecular weight of the hydrogenated block A of the butadiene polymer is less than 2,500, the resultant molded articles having good stiffness cannot be obtained. On the contrary, when the number average molecular weight of the hydrogenated block A of the butadiene polymer exceeds 200,000, the result is a high melt viscosity of the hydrogenated block copolymer (2), which means that the resultant polymer composition will exhibit poor moldability.

Where the degree of hydrogenation of the hydrogenated block A of the butadiene polymer is less than 85%, there cannot be obtained molded articles which are excellent in stiffness and thermal aging resistance. Accordingly, the hydrogenated block A of the butadiene polymer should preferably have a degree of hydrogenation of not lower than 85%, more preferably not lower than 90%.

The ratio of the block A in the hydrogenated block copolymer (2) should preferably be in the range of 5 to 70 wt %, more preferably 20 to 50 wt %. When the ratio of the block A in the block copolymer (2) is less than 5 wt %, the stiffness of the resultant molded articles obtained from the composition lowers. On the other hand, when the ratio of the block A in the block copolymer (2) exceeds 70 wt %, the molded article obtained from the polymer composition becomes unsatisfactory with respect to the impact resistance at low temperatures.

The block B in the hydrogenated block copolymer which is the component (2) of the thermoplastic polymer composition of the present invention consists essentially of a hydrogenated block of a polymer of isoprene/butadiene at a ratio by weight of 30:70 to 100:0.

When the vinyl bond content in the block B exceeds 20%, the molded articles obtained from such a polymer composition becomes poor in impact resistance at low temperatures. Accordingly, the vinyl bond content in the block B should be lower than 20%.

If the number average molecular weight of the block B is lower than 30,000, the impact resistance of the resultant molded articles at low temperatures becomes unsatisfactory. In contrast, when the molecular weight exceeds 300,000, the resultant hydrogenated block copolymer (2) becomes so high in melt viscosity that the moldability of the polymer composition is worsened.

Thus, the block B in the hydrogenated block copolymer (2) should have a number average molecular weight of 30,000 to 300,000.

Moreover, if the degree of hydrogenation in the hydrogenated block B is less than 70%, final molded articles are not good with respect to the thermal aging resistance. Thus, it is preferred that the hydrogenated block B should have a degree of hydrogenation of not less than 70%.

Where the content of isoprene in the block B is less than 30 wt %, the molded articles obtained from the polymer composition are not satisfactory with respect to the impact resistance at low temperatures. Accordingly, the content of isoprene in the block B should be not less than 30 wt %.

Where the block B is made of an isoprene polymer and a butadiene polymer, the manner of polymerization between the isoprene polymer and the butadiene polymer may be in the form of a random, block or taper, of which the random polymerization is preferred.

Where the hydrogenated block copolymer (2) comprises, aside from the blocks A and B, a block C, the hydrogenated block copolymer (2) is remarkably improved in compatibility with polypropylene. The vinyl bond content in the block C should be not less than 40%. If the vinyl bond content in the block C is less than 40%, the improvement in the compatibility is not significant. The content of the block C in the hydrogenated block copolymer (2) should preferably be not larger than 70 wt %, more preferably not larger than 50 wt %. When the content of the block C exceeds 50 wt %, the molded articles obtained from the resultant polymer composition are undesirably degraded with respect to the impact resistance at low temperatures. The block C should have a number average molecular weight of not higher than 200,000. The number average molecular weight exceeding this range is unfavorable because the resultant hydrogenated block copolymer (2) has too high a melt viscosity.

Where the degree of hydrogenation in the hydrogenated block C is less than 70%, there cannot be obtained molded articles having a good thermal aging resistance. Accordingly, the hydrogenated block C should preferably have a degree of hydrogenation of not less than 70%.

The hydrogenated block copolymer (2) should preferably have a linear or branched block form represented by A-(B-A)m or (A-B)n wherein m and n are, respectively, an integer of 1 or over. More preferably, the block form should be represented by A-B-A or A-B. Where the hydrogenated block copolymer (2) further comprises the block (C), the block form is not critical and preferably includes a form of A-B-C, B-A-C or A-B-A-C.

When the hydrogenated block copolymer (2) has a number average molecular weight over 700,000, the resultant polymer composition becomes poor in moldability. In this sense, the block copolymer (2) should have a number average molecular weight of not larger than 700,000, preferably not larger than 300,000.

The hydrogenated block copolymer (2) should preferably have a melting point of not lower than 80° C. If two melting points exist, a higher melting point should preferably be not lower than 80° C. If the melting point is lower than 80° C., the molded articles obtained from such a polymer composition may have poor stiffness in some case.

In such an extent that the purposes of the present invention are not impeded, the hydrogenated block copolymer (2) has functional groups such as a carboxyl group, an acid anhydride group, a hydroxyl group, an epoxy group, an amino group and/or the like, at terminal end of the molecule or in the molecule chain.

When the amount of the hydrogenated block copolymer (2) is less than 5 parts by weight per 100 parts by weight of the polypropylene, the improvement attained by addition of the hydrogenated block copolymer (2) will not be appreciably expected. On the contrary, when the amount exceeds 100 parts, the molded articles obtained from the resultant polymer composition lower in stiffness. Thus, the hydrogenated block copolymer (2) is added in an amount of 5 to 100 parts by weight per 100 parts by weight of the polypropylene (1).

The block copolymer prior to the hydrogenation for obtaining the hydrogenated block copolymer (2) may be prepared, for example, according to a process wherein an alkyl lithium compound is used as an initiator and the respective monomers are sequentially added for polymerization, or according to a process wherein an intended polymer is obtained by coupling through couplers and the like.

The alkyl lithium compounds as an initiator include alkyl compounds whose alkyl moiety has 1 to 10 carbon atoms. Specific and preferred examples include methyl lithium, ethyl lithium, pentyl lithium, butyl lithium and the like.

The coupling agents include, for example, dichloromethane, dibromomethane, dichloroethane, dibromoethane, dibromobenzene, phenyl benzoate and the like.

The amount of the initiator depends on the molecular weight of an intended block copolymer and is preferably in the range of 0.01 to 0.2 parts by weight per 100 parts by weight of the total of the monomers used.

In order that the vinyl bond content in the block C is rendered not less than 40%, Lewis bases are used as a co-catalyst for the polymerization. Examples of the Lewis bases include ethers such as dimethyl ether, diethyl ether, tetrahydrofuran and the like, glycol ethers such as ethylene glycol dimethyl ether, diethylene glycol dimethyl ether and the like, and amine compounds such as triethylamine, N,N, N',N'-tetramethylethylenediamine, N-methylmorpholine and the like.

The solvents for the reaction may be organic solvents inert to the polymerization initiators. Preferred examples include aliphatic, alicyclic and aromatic hydrocarbons having 6 to 12 carbon atoms. Specific examples include hexane, heptane, cyclohexane, methylcyclohexane, benzene and the like.

The polymerization reaction is carried out under conditions of 0° to 80° C. and 0.5 to 50 hours for the preparation of all the blocks.

The hydrogenation reaction of the block copolymer should preferably be conducted according to any known procedure wherein a hydrogenation catalyst and a block copolymer are dissolved in a solvent inert to the reaction, followed by reaction with molecular hydrogen.

The catalysts for the hydrogenation reaction include, for example, Raney nickel, inhomogeneous catalysts wherein metals such as Pt, Pd, Ru, Rh, Ni and the like are supported on carriers such as carbon, alumina, diatomaceous earth and the like, or Ziegler catalysts made of combinations of transition metals and alkyl aluminium compounds or alkyl lithium compounds.

The hydrogenation reaction is conducted under conditions of a hydrogen pressure of a normal pressure to 200 kg/cm$^2$ at a normal temperature to 250° C. for a time of 1 to 100 hours.

The block copolymer obtained after completion of the hydrogenation reaction can be isolated by permitting the reaction solution to be coagulated such as in methanol, followed by heating or drying the reaction solution under reduced pressure to remove the solvent, or by pouring the reaction solution into boiling water to azeotropically remove the solvent therefrom, followed by heating and drying under reduced pressure.

The polypropylene (1) and the hydrogenated copolymer (2) should have a ratio between the melt viscosity of the hydrogenated block copolymer (2) and the melt viscosity of the polypropylene (1) of 0.5:1 to 10:1, preferably 1:1 to 8:1, when determined at 200° C. at a shear rate of 1220 second$^{-1}$.

If the ratio between the melt viscosity of the hydrogenated block copolymer (2) and the melt viscosity of the polypropylene (1) is less than 0.5:1 when determined at 200° C. at a shear rate of 1220 second$^{-1}$, slipping is liable to occur in the melting and kneading steps for the polymer composition. This makes it difficult to knead the components (1) and (2) sufficiently, disenabling one to obtain a uniform polymer composition. On the contrary, when the ratio exceeds 10:1, the hydrogenated block copolymer is unlikely to disperse, so that a uniform polymer composition could not be obtained.

The ethylene/propylene rubber used as the component (C) is blended in an amount of up to 100 parts by weight per 100 parts by weight of the polypropylene (1). When the ethylene/propylene rubber (3) exceeds 100 parts by weight per 100 parts by weight of the polypropylene, the molded articles obtained from the resultant polymer composition exhibits poor stiffness.

The ethylene/propylene rubbers include ethylene/propylene two- component rubbery copolymers, and ethylene/propylene/non-conjugated diene three-component rubbery copolymers.

Preferred ethylene/propylene rubbers include ones which have a propylene content of 10 to 60 wt %, preferably from 20 to 40 wt %.

The thermoplastic polymer composition of the present invention may further comprise, in amounts not impeding the inherent characteristics thereof, various types of additives including fillers such as carbon black, silica, calcium carbonate, talc, mica, magnesium hydroxide, clay, barium sulfate, natural silicic acid, titanium oxide, basic magnesium sulfate and the like, fibrous fillers such as glass fibers, surface-treated glass fibers, carbon fibers, ceramic fibers and the like, antioxidants, UV absorbers, colorants, crosslinking agents, foaming agents, flame retardants, nucleating agents, antistatic agents, coating improvers and the like.

Moreover, the polymer composition of the present invention may further comprise, in amounts not impeding the characteristics thereof, thermoplastic polymers such as styrene-butadiene block copolymers and hydrogenated products thereof, styrene-isoprene block copolymers and hydrogenated products thereof, styrene-isobutylene block copolymers, polyethylene, ethylene-vinyl acetate copolymers, ethylene-ethyl acrylate copolymers, ethylene-methyl methacrylate copolymers, ethylene-α-olefin copolymers and the like. These thermoplastic polymer may be blended in amounts of approximately not larger than 50 wt % of the thermoplastic polymer composition of the present invention.

The thermoplastic polymer composition of the present invention is prepared by blending by means of ordinary kneading machines such as kneaders, Banbury mixers, rolls, a Brabender plastograph, monoaxial extruders, biaxial extruders and the like.

The procedures of molding the thermoplastic polymer composition of the present invention are not critical. Ordinary molding methods are usable including press molding, injection molding, extrusion molding, blow molding, sheet molding, film molding, laminate molding, rotary moldings and the like. Of these, the injection molding is preferred.

The thermoplastic polymer composition of the present invention is usually molded by a procedure which comprises kneading such as in extruders to obtain pellets, and subjecting the pellets, as a starting material, to molding. In a specific case, the respective components may be directly fed to a molding machine and molded while kneading in the machine.

The thermoplastic polymer composition of the present invention has good moldability and is advantageous in its capability of providing molded articles which have good stiffness, good impact resistance at low temperatures and excellence in economy and the ease in recycling. For instance, the polymer composition is moldable into external parts of automobiles such as bumpers, body guard moldings, tire housings and the like, internal parts of automobiles such as dash boards, various types of parts such as of electronic and domestic appliances, housing materials, medical materials, sporting goods, packages, packaging films, toys, domestic appliances, stationary articles, and the like.

The polymer composition of the present invention which comprises polypropylene and a specific type of hydrogenated block copolymer has good moldability and can provide molded articles which have excellent properties such as stiffness, low temperature impact resistance at low temperatures. Thus, the polymer composition of the present invention has a great merit from the practical and industrial standpoint not only as moldings such as of internal and external parts of automobiles, but also as a starting material for various types of moldings.

EXAMPLES

The present invention is more particularly described by way of examples.

Referential Example 1

Preparation of Block Copolymers

Butadiene was polymerized in an autoclave purged with dried nitrogen and using cyclohexane as a solvent and n-butyl lithium as a catalyst for polymerization, followed by further polymerization of isoprene to obtain A-B type block copolymers (I), (II), (III), (V), (VI), (VII) and (X).

Referential Example 2

Preparation of Block Copolymer

Butadiene was polymerized in an autoclave purged with dried nitrogen and using cyclohexane as a solvent and n-butyl lithium as a catalyst for polymerization, followed by further polymerization of mixed monomers of butadiene and isoprene having an isoprene content of 50 wt % and then followed by polymerization of butadiene to obtain an A-B-A type block copolymer (IV).

Referential Example 3

Preparation of Block Copolymer

Butadiene was polymerized in an autoclave purged with dried nitrogen and using cyclohexane as a solvent, n-butyl lithium as a catalyst for polymerization and tetrahydrofuran for a vinylating agent, followed by further polymerization of isoprene to obtain an A-B type block copolymer (VIII).

Referential Example 4

Preparation of Block Copolymer

Isoprene was polymerized in an autoclave purged with dried nitrogen and using cyclohexane as a solvent and n-butyl lithium as a catalyst for polymerization, after which butadiene was further polymerized. Then, tetrahydrofuran was added to the reaction system as a vinylating agent, followed by further polymerization of isoprene to obtain a B-A-C type block copolymer (IX).

Referential Example 5

Preparation of Hydrogenated Block Copolymers

The block copolymers obtained References 1 to 4 were, respectively, subjected to hydrogenation reaction in cyclohexane at a hydrogen pressure of 20 kg/cm$^2$ in the presence of a Pd-C catalyst for hydrogenation, thereby obtaining hydrogenated block copolymers (i) to (x) corresponding to the block copolymers (I) to (X), respectively.

The characteristics of the block copolymers (I) to (X) and the hydrogenated block copolymers (i) to (x) are shown in Tables 1 and 2. In Tables 1 and 2, the number average molecular weight means a molecular weight, calculated as polystyrene, prior to the hydrogenation as determined according to the GPC method. The melting point was measured according to the DSC (differential scanning calorimetry) method. The melt viscosity was measured under the conditions of a temperature of 200° C. and a shear rate of 1220 second$^{-1}$.

TABLE 1

|  | BLOCK COPOLYMER | | | | |
| --- | --- | --- | --- | --- | --- |
|  | I | II | III | IV | V |
| (BLOCK A) | | | | | |
| NUMBER AVERAGE MOLECULAR WEIGHT ($\times 10^{-3}$) | 35 | 70 | 6 | 18 | 150 |
| VINYL BOND CONTENT (%) | 8 | 8 | 8 | 8 | 8 |
| (BLOCK B) | | | | | |
| NUMBER AVERAGE MOLECULAR WEIGHT ($\times 10^{-3}$) | 65 | 130 | 56 | 60 | 278 |
| VINYL BOND CONTENT (%) | 7 | 7 | 7 | 7 | 7 |
| ISOPRENE CONTENT (%) | 100 | 100 | 100 | 50 | 100 |
| BLOCK FORM | A-B | A-B | A-B | A-B-A | A-B |
|  | HYDROGENATED BLOCK COPOLYMER | | | | |
|  | i | ii | iii | iv | v |
| NUMBER AVERAGE MOLECULAR WEIGHT ($\times 10^{-3}$) | 100 | 200 | 62 | 96 | 428 |
| HYDROGENATION RATE (%) | 99 | 98 | 99 | 98 | 99 |
| MELT VISCOSITY (POISES) | 3520 | 4340 | 1800 | 3640 | 5350 |
| MELTING POINT (°C.) | 100 | 101 | 99 | 98 | 101 |

TABLE 2

|  | BLOCK COPOLYMER | | | | |
| --- | --- | --- | --- | --- | --- |
|  | VI | VII | VIII | IX | X |
| (BLOCK A) | | | | | |
| NUMBER AVERAGE MOLECULAR WEIGHT ($\times 10^{-3}$) | 6 | 14 | 35 | 72 | 6 |
| VINYL BOND CONTENT (%) | 8 | 8 | 30 | 8 | 8 |
| (BLOCK B) | | | | | |
| NUMBER AVERAGE MOLECULAR WEIGHT ($\times 10^{-3}$) | 41 | 26 | 65 | 110 | 22 |
| VINYL BOND CONTENT (%) | 7 | 7 | 30 | 7 | 7 |
| ISOPRENE CONTENT (wt. %) | 100 | 100 | 100 | 100 | 100 |
| (BLOCK C) | | | | | |
| NUMBER AVERAGE MOLECULAR WEIGHT ($\times 10^{-3}$) | — | — | — | 61 | — |
| VINYL BOND CONTENT (%) | — | — | — | 50 | — |
| ISOPRENE CONTENT (wt. %) | — | — | — | 100 | — |
| BLOCK FORM | A-B | A-B | A-B | B-A-C | A-B |
|  | HYDROGENATED BLOCK COPOLYMER | | | | |
|  | vi | vii | viii | ix | x |
| NUMBER AVERAGE MOLECULAR WEIGHT ($\times 10^{-3}$) | 47 | 40 | 100 | 243 | 28 |
| HYDROGENATION RATE (%) | 99 | 95 | 98 | 95 | 98 |

TABLE 2-continued

| MELT VISCOSITY (POISES) | 800 | 320 | 3300 | 5050 | COULD NOT BE MEASURED |
|---|---|---|---|---|---|
| MELTING POINT (°C.) | 103 | 101 | 63 | 101 | 101 |

In examples and comparative examples appearing hereinafter, the following polypropylene and an ethylene/propylene rubber were used.

Polypropylene

PP-1: Block polypropylene (BC-1 of Mitsubishi Petrochemical Co., Ltd.) having an MFR value of 30 g/10 minutes and a melt viscosity of 780 poises as determined under the conditions of 200° C. and a shear rate of 1220 second$^{-1}$.

PP-2: homopolypropylene (MR002V of Mitsubishi Petrochemical Co., Ltd.) having an MFR value of 200 g/10 minutes and a melt viscosity of 390 poises as determined under the conditions of 200° C. and a shear rate of 1220 second$^{-1}$.

PP-3: Homopolypropylene (MA-2A of Mitsubishi Petrochemical Co., Ltd.) having an MFR value of 25 g/10 minutes and a melt viscosity of 850 poises as determined under the conditions of 200° C. and a hear rate of 1220 second$^{-1}$.

Ethylene/Propylene Rubber

EPR: Ethylene/propylene rubber (Esprene V0111 of Sumitomo Chemical Co., Ltd.) having an MFR value of 1.6 g/10 minutes and a propylene content of 22 wt %.

Example 1

100 parts by weight of polypropylene (PP-1) and 40 parts by weight of the hydrogenated block copolymer (i) obtained in Referential Example 5 were kneaded by use of a biaxial extruder at a temperature of 200° C. and at 100 r.p.m., thereby obtaining pellets.

Thereafter, the thus obtained pellets was injection molded at 230° C. to obtain test pieces having the thickness of 3 millimeters, followed by assessment of physical properties. The results are shown in Table 5.

Examples 2 to 7

100 parts by weight of polypropylene (PP-1) and 40 parts by weight of each of the hydrogenated block copolymers (ii) to (vi) and (ix) obtained in Referential Example 5 were kneaded in the same manner as in Example 1, thereby obtaining pellets.

The thus obtained pellets were injection molded in the same manner as in Example 1 to obtain test pieces having the thickness of 3 millimeters, followed by assessment of physical properties, with the results shown in Table 5.

Example 8

100 parts by weight of polypropylene (PP-1), 30 parts by weight of the hydrogenated block copolymer (i) and 10 parts by weight of ethylene/propylene rubber (EPR) were kneaded in the same manner as in Example 1, thereby obtaining pellets.

The thus obtained pellets were injection molded in the same manner as in Example 1 to obtain test pieces having the thickness of 3 millimeters, followed by assessment of physical properties, with the results shown in Table 5.

Example 9

100 parts by weight of polypropylene (PP-3) and 70 parts by weight of the hydrogenated block copolymer (ii) were kneaded in the same manner as in Example 1, thereby obtaining pellets.

The thus obtained pellets were injection molded in the same manner as in Example 1 to obtain test pieces having the thickness of 3 millimeters, followed by assessment of physical properties, with the results shown in Table 5.

Comparative Example 1

100 parts by weight of polypropylene (PP-1) and 40 parts by weight of the hydrogenated block copolymer (vii) obtained in Referential Example 5 were kneaded in the same manner as in Example 1, but stable strands could not be obtained.

Comparative Example 2

100 parts by weight of polypropylene (PP-2) and 40 parts by weight of the hydrogenated block copolymer (v) were kneaded in the same manner as in Example 1, thereby obtaining pellets.

The thus obtained pellets were injection molded in the same manner as in Example 1 to obtain test pieces having the thickness of 3 millimeters, followed by assessment of physical properties. The physical properties were greatly varied and thus, the molded test pieces had not uniform physical properties.

Comparative Example 3

100 parts by weight of polypropylene (PP-1) and 40 parts by weight of the hydrogenated block copolymer (viii) were kneaded in the same manner as in Example 1, thereby obtaining pellets.

The thus obtained pellets were injection molded in the same manner as in Example 1 to obtain test pieces having the thickness of 3 millimeters, followed by assessment of physical properties. The results are shown in Table 5. The test pieces were inferior in stiffness to those pieces obtained from the polymer compositions of the examples 1–9.

Comparative Example 4

100 parts by weight of polypropylene (PP-1) and 40 parts by weight of the ethylene/propylene rubber (EPR) were kneaded in the same manner as in Example 1, thereby obtaining pellets.

The thus obtained pellets were injection molded in the same manner as in Example 1 to obtain test pieces having the thickness of 3 millimeters, followed by assessment of physical properties. The results are shown in Table 5. The test pieces were inferior in impact resistance at low temperatures to those pieces obtained from the polymer compositions of the examples 1–9.

Comparative Example 5

100 parts by weight of polypropylene (PP-3) and 70 parts by weight of the ethylene/propylene rubber (EPR) were kneaded in the same manner as in Example 1, thereby obtaining pellets.

The thus obtained pellets were injection molded in the same manner as in Example 1 to obtain test pieces having the thickness of 3 millimeters, followed by assessment of physical properties. The results are shown in Table 5. The test pieces were inferior in impact resistance at low temperatures to those pieces obtained from the compositions of the examples 1–9.

The ratio or ratios of the compositions used in the examples and comparative examples, the melt viscosity ratio (i.e. melt viscosity of hydrogenated block copolymer/melt viscosity of polypropylene) under the conditions of a temperature of 200° C. and a shear rate of 1220 second$^{-1}$, and the moldability are shown in Tables 3 and 4.

The moldability of the polymer compositions of the examples and comparative examples and the physical properties of the molded pieces obtained from the respective polymer compositions were, respectively, evaluated according to the following procedures.

Moldability

Evaluated in terms of an MFR value (g/10 minutes) determined at a temperature of 230° C. under a load of 2.16 kg.

Impact Resistance at Low Temperatures

Evaluated in terms of an impact strength (kgf-cm/cm) at −20° C. according to the notched Izod impact test.

Stiffness

Evaluated in terms of a modulus in bending (kg/cm$^2$) at 25° C., which is measured according to the method described in JIS (Japan Industrial Standard) K7203.

TABLE 3

| No. | POLYPROPYLENE | HYDROGENATED BLOCK COPOLYMER | EPR | MELT VISCOSITY RATIO(*) | MOLDABILITY (**) |
|---|---|---|---|---|---|
| EXAMPLE 1 | PP-1 100 | (i) 40 | 0 | 4.5 | 18.0 |
| EXAMPLE 2 | PP-1 100 | (ii) 40 | 0 | 5.6 | 12.5 |
| EXAMPLE 3 | PP-1 100 | (iii) 40 | 0 | 2.3 | 22.0 |
| EXAMPLE 4 | PP-1 100 | (iv) 40 | 0 | 4.7 | 20.0 |
| EXAMPLE 5 | PP-1 100 | (v) 40 | 0 | 6.6 | 10.3 |
| EXAMPLE 6 | PP-1 100 | (ix) 40 | 0 | 6.5 | 11.0 |
| EXAMPLE 7 | PP-1 100 | (x) 40 | 0 | 1.0 | 24.5 |
| EXAMPLE 8 | PP-1 100 | (i) 30 | 10 | 4.5 | 16.2 |
| EXAMPLE 9 | PP-3 100 | (ii) 70 | 0 | 5.1 | 10.2 |

(*) ... MELT VISCOSITY OF HYDROGENATED BLOCK COPOLYMER/MELT VISCOSITY OF POLYPROPYLENE AT 200° C. AT A SHEAR RATE OF 1220 (SECOND$^{-1}$)
(**) ... MFR (g/10 MINUTES) DETERMINED AT A TEMPERATURE OF 230° C. UNDER A LOAD OF 2.16 KG

TABLE 4

| No. | POLYPROPYLENE | HYDROGENATED BLOCK COPOLYMER | EPR | MELT VISCOSITY RATIO(*) | MOLDABILITY (**) |
|---|---|---|---|---|---|
| COMPARATIVE EXAMPLE 1 | PP-1 100 | (vii) 40 | 0 | 0.4 | — |
| COMPARATIVE EXAMPLE 2 | PP-2 100 | (v) 40 | 0 | 13.7 | — |
| COMPARATIVE EXAMPLE 3 | PP-1 100 | (viii) 40 | 0 | 4.2 | 18.0 |
| COMPARATIVE EXAMPLE 4 | PP-1 100 | 0 | 40 | — | 11.0 |
| COMPARATIVE EXAMPLE 5 | PP-3 100 | 0 | 70 | — | 9.8 |

(*) ... MELT VISCOSITY OF HYDROGENATED BLOCK COPOLYMER/MELT VISCOSITY OF POLYPROPYLENE AT 200° C. AT A SHEAR RATE OF 1220 (SECOND$^{-1}$)
(**) ... MFR (g/10 MINUTES) DETERMINED AT A TEMPERATURE OF 230° C. UNDER A LOAD OF 2.16 KG

TABLE 5

| No. | IMPACT STRENGTH (kgf·cm/cm) | MODULUS IN BENDING (kg/cm²) |
| --- | --- | --- |
| EXAMPLE 1 | 52 | 5600 |
| EXAMPLE 2 | 75 | 5400 |
| EXAMPLE 3 | 40 | 5350 |
| EXAMPLE 4 | 61 | 5300 |
| EXAMPLE 5 | 78 | 5250 |
| EXAMPLE 6 | 72 | 5200 |
| EXAMPLE 7 | 21 | 5300 |
| EXAMPLE 8 | 40 | 5410 |
| EXAMPLE 9 | 53 | 6500 |
| COMPARATIVE EXAMPLE 3 | 48 | 4800 |
| COMPARATIVE EXAMPLE 4 | 12 | 5400 |
| COMPARATIVE EXAMPLE 5 | 14 | 6300 |

Comparative Example 6

100 parts by weight of polypropylene (PP-1) and 40 parts by weight of the hydrogenated block copolymer (x) obtained in Referential Example 5 were kneaded by use of Brabender-plastograph at a temperature of 200° C. at 100 r.p.m. to obtain a softened polymer composition.

The composition was press molded to obtain test pieces having the thickness of 3 millimeters, followed by measurement of impact strength according to the notched Izod impact test. The strength was found to be 8 kgf·cm/cm, which was inferior to those values of the test pieces obtained from the polymer compositions of the examples 1–9.

What is claimed is:

1. A thermoplastic polymer composition which comprises:

100 parts by weight of polypropylene (1);

5 to 100 parts by weight of a hydrogenated block copolymer (2) which has at least one block A, at least one block B and at least one block C and which has a number average molecular weight of not higher than 700,000 wherein the block A consists essentially of a butadiene polymer having a number average molecular weight of 2500 to 200,000 and a vinyl bond content of not higher than 20%, the block B consists essentially of a polymer of isoprene and butadiene at a ratio by weight of 30:70 to 100:0 and has a number average molecular weight of 30,000 to 300,000 and a vinyl bond content of not higher than 20%, and the block C consists essentially of a polymer of isoprene and butadiene at a ratio by weight of 0:100 to 100:0 and has a number average molecular weight of not higher than 200,000 and a vinyl bond content of not less than 40%; and 0 to 100 parts by weight of an ethylene/propylene rubber, wherein the ratio of the melt viscosity of said hydrogenated block copolymer (2) to the melt viscosity of said polypropylene (1), as determined at 200° C. at a shear rate of 1220 second$^{-1}$, is in the range of 0.5:1 to 10:1.

2. A thermoplastic polymer composition according to claim 1, wherein the polymer block A has a degree of hydrogenation of not less than 85%.

3. A thermoplastic polymer composition according to claim 1, wherein the polymer block A has a degree of hydrogenation of not less than 90%.

4. A thermoplastic polymer composition according to claim 1, wherein the polymer block B has a degree of hydrogenation of not less than 70%.

5. A thermoplastic polymer composition according to claim 1, wherein the polymer block C has a degree of hydrogenation of not less than 70%.

6. A thermoplastic polymer composition according to claim 1, wherein said hydrogenated block copolymer (2) comprises the polymer block A, the polymer block B and the polymer block C in the block form of A-B-C, B-A-C or A-B-A-C.

7. A thermoplastic polymer composition according to claim 1, wherein said hydrogenated block copolymer (2) has a number average molecular weight of not higher than 300,000.

8. A thermoplastic polymer composition according to claim 1, wherein said hydrogenated block copolymer (2) has a melting point not lower than 80° C.

9. A thermoplastic polymer composition according to claim 1, wherein said polypropylene has an MFR value of not less than 5 g/10 minutes when determined at 230° C. under a load of 2.16 kg.

10. A thermoplastic polymer composition according to claim 1, wherein a ratio between a melt viscosity of said hydrogenated block copolymer (2) and a melt viscosity of said polypropylene is in the range of 1:1 to 8:1 when determined at 200° C. at a shear rate of 1220 second$^{-1}$.

11. A thermoplastic polymer composition according to claim 1, wherein the content of block C in the hydrogenated block copolymer (2) is not greater than 70 weight percent.

12. A thermoplastic polymer composition according to claim 11, wherein said block C content is not greater than 50 weight percent.

* * * * *